United States Patent
Kim et al.

(10) Patent No.: US 12,412,900 B2
(45) Date of Patent: Sep. 9, 2025

(54) CONDUCTOR PRE-DISPERSION SLURRY FOR SECONDARY BATTERY ELECTRODE, PREPARATION METHOD THEREFOR, ELECTRODE MANUFACTURED BY APPLYING CONDUCTOR PRE-DISPERSION SLURRY, AND SECONDARY BATTERY COMPRISING SAME ELECTRODE

(71) Applicant: DONGJIN SEMICHEM CO., LTD., Incheon (KR)

(72) Inventors: Hyeong Cheol Kim, Seongnam-si (KR); Chul Huh, Seongnam-si (KR); Hwi Chan Yang, Seongnam-si (KR); Joo Cheol Lee, Seongnam-si (KR); Ju Kyung Han, Seongnam-si (KR); Woo Hyun An, Seongnam-si (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 15 days.

(21) Appl. No.: 18/338,640

(22) Filed: Jun. 21, 2023

(65) Prior Publication Data
US 2023/0335747 A1 Oct. 19, 2023

Related U.S. Application Data

(63) Continuation of application No. PCT/KR2021/018682, filed on Dec. 9, 2021.

(30) Foreign Application Priority Data

Dec. 22, 2020 (KR) .................. 10-2020-0181127

(51) Int. Cl.
*H01B 1/24* (2006.01)
*C09D 5/24* (2006.01)
(Continued)

(52) U.S. Cl.
CPC .............. *H01M 4/625* (2013.01); *C09D 5/24* (2013.01); *C09D 7/45* (2018.01); *C09D 7/61* (2018.01);
(Continued)

(58) Field of Classification Search
CPC .. H01B 1/00; H01B 1/24; C09D 5/24; H01M 4/622; H01M 4/625
See application file for complete search history.

(56) References Cited

U.S. PATENT DOCUMENTS 11,286,164 B2 * 3/2022 Morita ..................... C01B 32/17
11,581,527 B2 * 2/2023 Jiang .................. H01M 4/1391
(Continued)

FOREIGN PATENT DOCUMENTS

| KR | 10-2013-0029977 A | 3/2013 |
| KR | 20130029977 A † | 8/2013 |
| KR | 10-2014-0140980 A | 12/2014 |
| KR | 10-2015-0122653 A | 11/2015 |
| KR | 20150122653 A † | 11/2015 |
| KR | 10-2019-0093174 A | 8/2019 |
| WO | 2020/197670 A1 | 10/2020 |

OTHER PUBLICATIONS

Huang et al "Poly(vinyl pyrrolidone) wrapped multi-walled carbon nanotube/poly(vinyl alcohol) composite hydrogels", Composites: Part A 42 (2011) 1398-1405.*
(Continued)

*Primary Examiner* — Mark Kopec
(74) *Attorney, Agent, or Firm* — United One Law Group LLC; Kongsik Kim; Jhongwoo Peck

(57) ABSTRACT

A conductive material pre-dispersed slurry for a secondary battery electrode includes: a conductive material; a dispersant for dispersing the conductive material; and a solvent mixed with the conductive material and the dispersant. The dispersant includes a cellulose-based compound and a vinyl-based or acrylic compound, and the cellulose-based compound and the vinyl-based or acrylic compound in the dispersant have a weight ratio of about 25:1 to 1:25.

16 Claims, 7 Drawing Sheets

(51) Int. Cl.
*C09D 7/40* (2018.01)
*C09D 7/45* (2018.01)
*C09D 7/61* (2018.01)
*C09D 7/65* (2018.01)
*C09D 7/80* (2018.01)
*C09D 101/28* (2006.01)
*C09D 129/04* (2006.01)
*C09D 133/02* (2006.01)
*C09D 133/26* (2006.01)
*C09D 139/06* (2006.01)
*H01M 4/62* (2006.01)
*B82Y 30/00* (2011.01)
*B82Y 40/00* (2011.01)

(52) U.S. Cl.
CPC ................. *C09D 7/65* (2018.01); *C09D 7/70* (2018.01); *C09D 7/80* (2018.01); *C09D 101/286* (2013.01); *C09D 129/04* (2013.01); *C09D 133/02* (2013.01); *C09D 133/26* (2013.01); *C09D 139/06* (2013.01); *H01B 1/24* (2013.01); *H01M 4/622* (2013.01); *B82Y 30/00* (2013.01); *B82Y 40/00* (2013.01)

(56) References Cited

U.S. PATENT DOCUMENTS

| 2006/0222952 | A1* | 10/2006 | Kono | H01M 4/5825 |
| | | | | 429/231.95 |
| 2009/0311600 | A1* | 12/2009 | Minami | H01M 4/62 |
| | | | | 29/623.5 |
| 2019/0372121 | A1* | 12/2019 | Chen | H01M 4/505 |
| 2020/0106124 | A1* | 4/2020 | Wang | H01M 4/587 |

OTHER PUBLICATIONS

A high-quality aqueous graphene conductive slurry applied in anode of lithium-ion batteries YoungJian et al, Journal of Alloys and Compounds 830 (2020) 154575.*

Kharissova et al "Dispersion of carbon nanotubes in water and non-aqueous solvents", RSC Adv., 2013, 3, 24812.*

English language machine translation of form PCT/ISA/210 (mail date Mar. 2022).*

\* cited by examiner
† cited by third party

CONDUCTOR PRE-DISPERSION SLURRY FOR SECONDARY BATTERY ELECTRODE, PREPARATION METHOD THEREFOR, ELECTRODE MANUFACTURED BY APPLYING CONDUCTOR PRE-DISPERSION SLURRY, AND SECONDARY BATTERY COMPRISING SAME ELECTRODE

CROSS-REFERENCE TO RELATED APPLICATION(S)

This application is a Continuation of International Application No. PCT/KR2021/018682 filed on Dec. 9, 2021, which claims priority from Korean Patent Application No. 10-2020-0181127, filed on Dec. 22, 2020. The aforementioned applications are incorporated herein by reference in their entireties.

BACKGROUND

1. Technical Field

The present disclosure relates to a material for an electrode, a battery including the same, and a manufacturing method thereof, and more particularly, to a conductive material pre-dispersed slurry for a secondary battery electrode, a preparation method thereof, an electrode manufactured by applying the conductive material pre-dispersed slurry, and a secondary battery having the electrode.

2. Related Art

Since secondary batteries appeared in the 1990s, they have continued to develop. Research and development are also being conducted together on auxiliary elements playing a role of complementing and improving their characteristics as well as cathode/anode active materials, electrolytes, and separators, which are the main components of the secondary batteries.

Conductive materials are contained in both the cathode and the anode, and are materials used in order to improve electron transfer characteristics between an active material and an active material or between an active material and a current collector. The conductive materials are being developed mainly with carbon-based materials. A conductive material pre-dispersed slurry is a solution in which a conductive material is dispersed in a solvent, and becomes a material constituting a slurry for an electrode together with an active material and a binder in a subsequent step.

Recently, as the field of application of secondary batteries has expanded to the field of medium and large-sized batteries such as those for electric vehicles and energy storage systems (ESS), the importance of conductive materials is increasing. In order to increase the theoretical capacity of the secondary batteries, it is necessary to increase the amount of a cathode active material or an anode active material. However, when the amount of active material increases in an electrode, the amount of conductive material decreases. Therefore, a conductive material capable of exhibiting excellent performance even with a small amount is required. In this regard, carbon nanotubes (CNTs) are attracting attention as a new material for the conductive material. The CNTs have a cylindrical structure with a nano-sized diameter, have carbon atoms helically arranged therein, and have an $sp^2$ bonding structure. These CNTs can exhibit excellent physical properties in various aspects, such as excellent electrical properties, strength, resilience, and thermal conductivity. As a conductive material for a secondary battery electrode, it is expected that the CNTs, compared to conventional powder-type carbon materials, can not only increase energy density and improve lifespan, but also reduce the size of batteries. In particular, these advantages can be more advantageously seen in batteries for electric vehicles that require high capacity, rapid charging, and the like.

However, despite various advantages as described above, since CNTs have low solubility and dispersibility, it is difficult to apply them as an actual conductive material. In particular, the CNTs exist in the form of aggregates or bundles in a solution due to strong van der Waals attraction between the CNTs. In the development of a conductive material to which CNTs are applied, a technology capable of effectively dispersing the CNTs is required, and in particular, a method capable of properly or easily dispersing the CNTs while minimizing damage to the CNTs is required. When the surface of the CNTs is treated with an acid to disperse the CNTs in a solvent, defects may occur on the surface of the CNTs, and thus physical properties such as electrical conductivity may deteriorate. Meanwhile, when a surfactant is used to disperse CNTs, since the amount of surfactant used also increases as the content of CNTs increases, there are problems in that, due to the surfactant, the viscosity of the solution increases, and physical properties such as electrical conductivity decrease.

SUMMARY

An aspect of the present disclosure provides a technique and method capable of effectively dispersing CNTs while preventing or minimizing damage to the CNTs in the development of a material for a conductive material, to which CNTs are applied.

Further, the present disclosure provides a conductive material pre-dispersed slurry for a secondary battery electrode, which has improved dispersion properties of CNTs (conductive material), and a preparation method thereof.

Further, the present disclosure provides a conductive material pre-dispersed slurry for a secondary battery electrode, which has a relatively high content of CNTs (conductive material) and a relatively low viscosity and can be easily prepared by a relatively simple process, and a preparation method thereof.

Further, the present disclosure provides an electrode manufactured by applying the above-described conductive material pre-dispersed slurry and a secondary battery to which such an electrode is applied.

The problems to be solved by the present disclosure are not limited to those mentioned above, and other problems will be clearly understood by those skilled in the art from the description below.

According to embodiments of the present disclosure, a conductive material pre-dispersed slurry for a secondary battery electrode may include a conductive material; a dispersant for dispersing the conductive material; and a solvent mixed with the conductive material and the dispersant. The dispersant may include a cellulose-based compound and a vinyl-based or acrylic compound, and the cellulose-based compound and the vinyl-based or acrylic compound in the dispersant may have a weight ratio of 25:1 to 1:25.

The cellulose-based compound may have a weight-average molecular weight (MW) of about 450,000 g/mol or less. The cellulose-based compound may have a degree of esterification (DE) of about 0.6 to about 1.0. The cellulose-based compound may be one or more selected from the group consisting of methyl cellulose, ethyl cellulose, hydroxyethyl cellulose, benzyl cellulose, trityl cellulose, cyanoethyl cellulose, carboxymethyl cellulose, carboxyethyl cellulose, aminoethyl cellulose, nitrocellulose, cellulose ether, and carboxymethylcellulose sodium salt.

The vinyl-based compound may have a weight-average molecular weight (MW) of about 6,000 to 80,000 g/mol, and the acrylic compound may have a weight-average molecular weight (MW) of about 8,000 to 150,000 g/mol. The vinyl-based or acrylic compound may surround a periphery of the conductive material. The vinyl-based compound may be one or more selected from the group consisting of polyvinylpyrrolidone, polyvinyl alcohol, polyvinyl chloride, polyvinyl fluoride, and polyvinyl acetate. The acrylic compound may be one or more selected from the group consisting of polyacrylic acid, polyacrylamide, and polyacrylonitrile.

The conductive material may be one or more selected from the group consisting of graphite, carbon black, graphene, and carbon nanotubes (CNTs). The carbon nanotubes (CNTs) may be multi-walled carbon nanotubes (MWCNTs). The multi-walled carbon nanotubes (MWCNTs) may have a diameter of about 4 to 12 nm. The carbon nanotubes (CNTs) and the dispersant may have a weight ratio (CNTs:dispersant) of about 1:0.2 to about 1:1.5. The carbon nanotubes (CNTs) may be contained in the conductive material pre-dispersed slurry in an amount of more than about 0 wt % and not more than 6 wt %. The conductive material pre-dispersed slurry may have a viscosity of about 3,000 cPs or less under conditions of a temperature of 25° C. and a shear rate of 50 $s^{-1}$. The conductive material pre-dispersed slurry may have a D50 particle size smaller than about 0.1 μm.

The solvent may include water.

In some embodiments of the present disclosure, an electrode for a secondary battery may be manufactured by applying the above-described conductive material pre-dispersed slurry.

In some embodiments of the present disclosure, a secondary battery may include the above-described electrode.

In some embodiments of the present disclosure, a method for preparing a conductive material pre-dispersed slurry for a secondary battery electrode may include the steps of: preparing a mixed solution which contains carbon nanotubes (CNTs) as a conductive material, a dispersant, and a solvent, the dispersant including a cellulose-based compound and a vinyl-based or acrylic compound, and in which the cellulose-based compound and the vinyl-based or acrylic compound in the dispersant have a weight ratio of 25:1 to 1:25; and high-pressure dispersing the mixed solution using a high-pressure disperser having an operating pressure of 200 bars or more.

The step of preparing the mixed solution may include the steps of: preparing a cellulose-based compound solution containing the cellulose-based compound and a vinyl-based or acrylic compound solution containing the vinyl-based or acrylic compound, respectively; preparing a primary mixed solution containing the cellulose-based compound solution, the vinyl-based or acrylic compound solution, and the CNTs; and stirring the primary mixed solution.

The high-pressure dispersion may be performed about 3 to 10 times at an operating pressure of about 500 to 2,500 bars.

According to embodiments of the present disclosure, in the development of a material for a conductive material, to which carbon nanotubes (CNTs) are applied, CNTs may be more effectively dispersed while damage to the CNTs can be prevented or minimized. Accordingly, it is possible to implement a conductive material pre-dispersed slurry for a secondary battery electrode, which has improved dispersion properties of CNTs (conductive material). In particular, it is possible to implement a conductive material pre-dispersed slurry for a secondary battery electrode, which has a relatively high content of the CNTs (conductive material) and a relatively low viscosity, and can be more easily prepared by a simpler process.

An electrode having excellent performance can be manufactured by applying the above-described conductive material pre-dispersed slurry, and a secondary battery can be manufactured based on the above-described electrode.

DETAILED DESCRIPTION

Hereinafter, embodiments of the present disclosure will be described in detail with reference to the accompanying drawings.

Embodiments of the present disclosure to be described below are provided to more clearly explain the present disclosure to those skilled in the art. The scope of the present disclosure is not limited by the following embodiments, and the following embodiments may be modified into many different forms.

Terms used in the present specification are used to describe specific embodiments and are not intended to limit the present disclosure. Terms in the singular form used in the present specification may include plural forms unless the context clearly indicates otherwise. Also, the terms "comprise" and/or "comprising" used in the present specification specify the presence of the mentioned shape, step, number, operation, member, element, and/or a group thereof, and do not exclude the presence or addition of one or more other shapes, steps, numbers, operations, members, elements and/ or groups thereof. In addition, the term "connection" used in the present specification is a concept which not only means that certain members are directly connected, but also includes that the members are indirectly connected with another member being additionally interposed between the members.

In addition, when a member is said to be located "on" another member in the present specification, this includes not only a case where a member is in contact with other member, but also a case where another member exists between the two members. The term "and/or" used in the present specification includes any one of the corresponding listed items and all combinations of one or more thereof. In addition, terms of degree such as "about" and "substantially" used in the present specification by taking into account inherent manufacturing and material tolerances are used in a range of their numerical values or degrees, or meanings close thereto, and are used in order to prevent infringers from unfairly using the disclosure in which exact or absolute numerical values are mentioned to help the understanding of this application.

Hereinafter, embodiments of the present disclosure will be described in detail with reference to the accompanying drawings. The size or thickness of regions or parts shown in the accompanying drawings may be somewhat exaggerated for clarity of the specification and convenience of description. The same reference numbers indicate the same elements throughout the detailed description.

Figure 1:
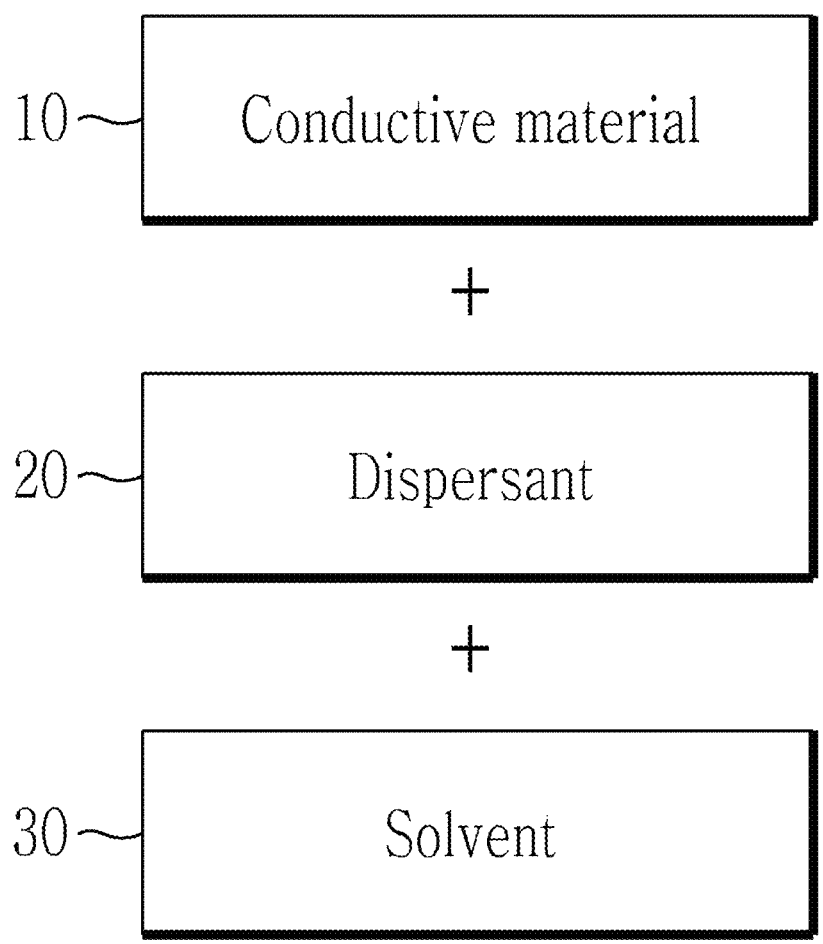
FIG. 1 is a view for explaining the configuration of a conductive material pre-dispersed slurry for a secondary battery electrode according to one embodiment of the present disclosure.

FIG. 1 is a view for explaining the configuration of a conductive material pre-dispersed slurry for a secondary battery electrode according to one embodiment of the present disclosure.

Referring to FIG. 1, the conductive material pre-dispersed slurry for a secondary battery electrode according to an embodiment of the present disclosure may include a conductive material 10, a dispersant 20 for dispersing the conductive material 10, and a solvent 30 mixed with the conductive material 10 and the dispersant 20 to provide fluidity. The conductive material 10 may be one or more selected from the group consisting of graphite, carbon black, graphene, and carbon nanotubes (CNTs), and may specifically be CNTs or include CNTs. The conductive material 10 may be made of a plurality of CNTs. The dispersant 20 may include a cellulose-based compound and a vinyl-based or acrylic compound. In the dispersant 20, the cellulose-based compound and the vinyl-based or acrylic compound may have a weight ratio of about 25:1 to about 1:25. Specifically, according to one embodiment of the present disclosure, the cellulose-based compound and the vinyl-based compound may have a weight ratio of 25:1 to 1:25, and according to another embodiment of the present disclosure, the cellulose-based compound and the acrylic compound may have a weight ratio of 25:1 to 1:25. The solvent 30 may be, for example, water.

When CNTs are used as the conductive material 10, a cellulose-based compound and a vinyl-based or acrylic compound are mixed and used as the dispersant 20, and the weight ratio thereof may be adjusted to about 25:1 to 1:25 so that the dispersion properties of the CNTs can be considerably improved, and the particle size of CNTs in the conductive material pre-dispersed slurry can be greatly lowered.

In this case, the cellulose-based compound may have a weight-average molecular weight (MW) of about 450,000 g/mol or less. Specifically, it may be 120,000 g/mol or less. For example, in an embodiment of the present disclosure, a cellulose-based compound having a weight-average molecular weight (MW) of about 50,000 to about 120,000 g/mol or a cellulose-based compound having a weight-average molecular weight (MW) of about 120,000 to about 450,000 g/mol may be used. Cellulose-based compounds may be used as binders in conventional slurries for secondary battery electrodes. In this case, molecular weights thereof are about 1,500,000 g/mol, which is considerably different from that of the cellulose-based compound used in the embodiment of the present disclosure. As in the embodiment of the present disclosure, when a cellulose-based compound having a weight-average molecular weight (MW) of about 450,000 g/mol or less is used, the viscosity of the conductive material pre-dispersed slurry may be lowered and the dispersibility of CNTs may be easily improved. In particular, when the cellulose-based compound has a weight-average molecular weight (MW) of about 120,000 g/mol or less, coating properties of the slurry for an electrode, including the conductive material pre-dispersed slurry, may be further improved, and the electrode formation may be further facilitated.

In addition, the cellulose-based compound used in the embodiment of the present disclosure may have a degree of esterification (DE) of about 0.6 to about 1.0. In carboxymethyl cellulose (CMC), one of the cellulose-based compounds, three OR groups exist in one monomer (refer to the chemical formula of FIG. 2), and the degree of esterification (DE) of the cellulose-based compound represents the degree (i.e., degree of substitution) of a hydroxyl group (—OH) substituted with an ester group, based on a cellulose monomer. The degree of esterification (DE) of the cellulose-based compound may have a range of 0 to 3 (i.e., corresponding to the number of OR groups in FIG. 2). The degree of esterification (DE) of carboxymethyl cellulose (CMC), which is one of the cellulose-based compounds used in the present embodiment, may be about 0.6 to about 1.0 or about 0.7 to about 0.9. As the degree of esterification (DE) of CMC increases, the hydrophilicity of CMC may increase. When the degree of esterification (DE) is less than 0.6, the degree of hydration is too low and may not mix well with water. When the degree of esterification (DE) exceeds 1.0, the dispersibility of CNTs may decrease.

The cellulose-based compound may be one or more selected from the group consisting of methyl cellulose, ethyl cellulose, hydroxyethyl cellulose, benzyl cellulose, trityl cellulose, cyanoethyl cellulose, carboxymethyl cellulose, carboxyethyl cellulose, aminoethyl cellulose, nitrocellulose, cellulose ether, and carboxymethylcellulose sodium salt.

Figure 2:
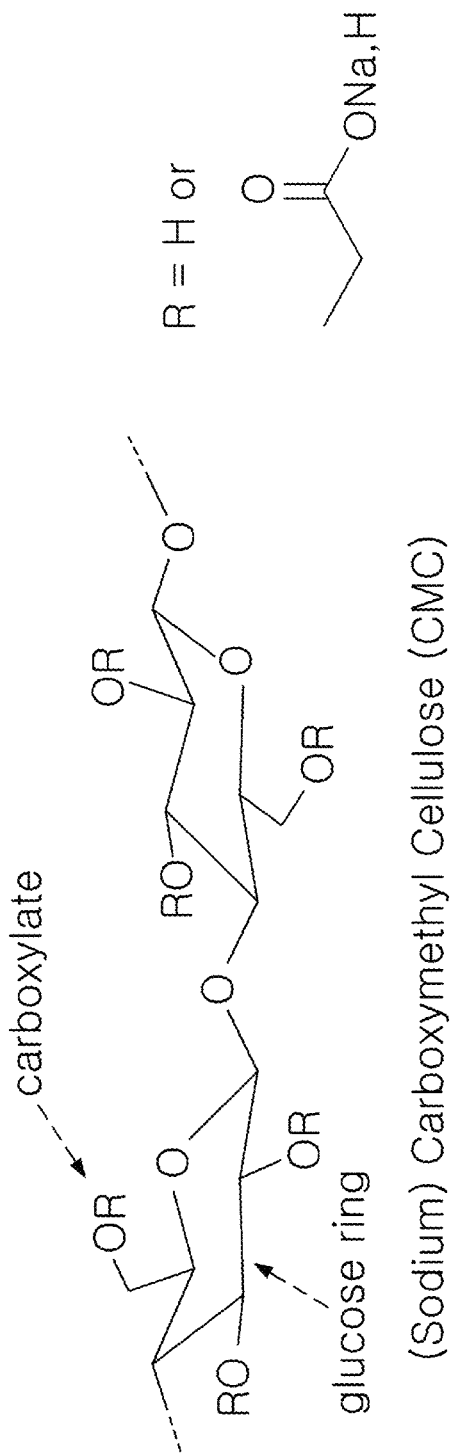
FIG. 2 is a view showing the chemical formula of carboxymethyl cellulose (CMC) among cellulose-based compounds that can be applied to a conductive material pre-dispersed slurry for a secondary battery electrode according to one embodiment of the present disclosure.

FIG. 2 is a view showing the chemical formula of CMC, which is one of cellulose-based compounds, that can be applied to a conductive material pre-dispersed slurry for a secondary battery electrode according to one embodiment of the present disclosure. CMC in FIG. 2 is sodium carboxymethyl cellulose (i.e., Na CMC).

Referring to FIG. 2, the glucose ring portion of CMC may bind to the surface of CNTs in a hydrophobic manner, and the carboxylate portion thereof may bind to water in a hydrophilic manner to play a role of dispersing CNTs in water. CMC may form a structure that is aligned with CNTs in water (solvent), and at this time, the binding of the hydrophobic portion may play an important role. In addition, the —OH group (i.e., equatorial hydroxyl group) in the equatorial direction of CMC may show a form that it is packed while being hydrogen-bonded with the glucose ring of another CMC. Such CMC may serve as a dispersion stabilizer for CNTs by using its rigid properties.

As described above, in the embodiment of the present disclosure, CMC may have a weight-average molecular weight (MW) of about 450,000 g/mol or less. When CMC having a weight-average molecular weight (MW) of about 450,000 g/mol or less is used, the viscosity of the conductive material pre-dispersed slurry may be lowered, and the dispersibility of CNTs may be easily improved. In addition, in the embodiment of the present disclosure, CMC may have a degree of esterification (DE) of about 0.6 to about 1.0. In CMC, the degree of substitution of a hydroxyl group with an ester group based on the cellulose monomer (i.e., degree of substitution) may be about 0.6 to about 1.0. In this case, CMC may easily improve the dispersibility of CNTs while being well mixed with the solvent (water).

As described in FIG. 1, in the embodiment of the present disclosure, a vinyl-based or acrylic compound together with CMC as the dispersant 20 may be additionally used. The vinyl-based or acrylic compound may be provided to surround the periphery of the conductive material. The vinyl-based compound used in the embodiment of the present disclosure may have a weight-average molecular weight (MW) of 6,000 to 80,000 g/mol, and the acrylic compound may have a weight-average molecular weight (MW) of 8,000 to 150,000 g/mol. More specifically, polyvinylpyrrolidone (PVP), which is one of the vinyl-based compounds, may have a weight-average molecular weight (MW) of about 6,000 to about 80,000 g/mol. More specifically, the PVP may have a weight-average molecular weight (MW) of about 6,000 to 15,000 g/mol. The PVP may be provided to surround the periphery of CNTs. In other words, the PVP may be provided so that it is adsorbed on the CNTs to surround (i.e., wrap) the CNTs. PVP may serve to disperse CNTs in a solvent (e.g., water) by being adsorbed on CNTs and surrounding the CNTs. In order to appropriately wrap the CNTs with PVP, it is necessary to use PVP having an appropriate length. In addition, the type (molecular weight) of PVP suitable therefor may vary depending on the type of the CNTs. When PVP has a weight-average molecular weight (MW) of less than 6,000 g/mol, the wrapping itself may not work well, the viscosity of the conductive material pre-dispersed slurry may increase, and the dispersibility of the CNTs may deteriorate. When PVP has a weight-average molecular weight (MW) exceeding 80,000 g/mol, the viscosity of the conductive material pre-dispersed slurry may increase, and the dispersibility of CNTs may decrease. Therefore, it may be preferable in the embodiment of the present disclosure that PVP has a weight-average molecular weight (MW) of about 6,000 to about 80,000 g/mol. Such PVP is used, and thus CNTs may be better dispersed, and flowability is improved, and thus a conductive material pre-dispersed slurry with a low viscosity may be prepared.

The vinyl-based compound may be one or more selected from the group consisting of polyvinylpyrrolidone, polyvinyl alcohol, polyvinyl chloride, polyvinyl fluoride, and polyvinyl acetate.

The acrylic compound may be one or more selected from the group consisting of polyacrylic acid, polyacrylamide, and polyacrylonitrile.

Figure 3:
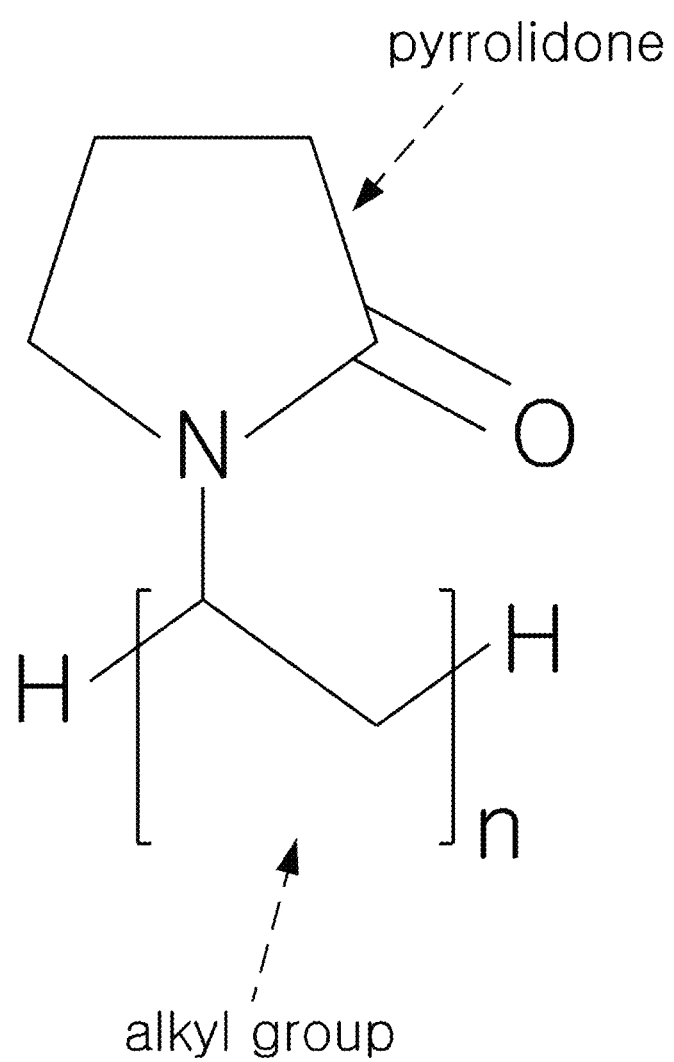
FIG. 3 is a view showing the chemical formula of polyvinylpyrrolidone (PVP) among vinyl-based compounds that can be applied to a conductive material pre-dispersed slurry for a secondary battery electrode according to one embodiment of the present disclosure.

FIG. 3 is a view showing the chemical formula of PVP that can be applied to a conductive material pre-dispersed slurry for a secondary battery electrode according to one embodiment of the present disclosure.

Referring to FIG. 3, a pyrrolidone group of PVP may be hydrophilic, and an alkyl group below it may be hydrophobic. The alkyl group may be flexible as a linear structure and may have a property of wrapping around the CNTs. When PVP has a weight-average molecular weight (MW) of less than 6,000 g/mol, since the linear structure of the alkyl group is shortened, CNT wrapping may not work well, and as a result, the viscosity of the conductive material pre-dispersed slurry may increase, and the CNT dispersibility may be lowered. When PVP has a weight-average molecular weight (MW) exceeding 80,000 g/mol, the molecular weight becomes excessively large so that the viscosity of the conductive material pre-dispersed slurry may increase, and the dispersibility of the CNTs may deteriorate. Therefore, as described above, it may be preferable in the embodiment of the present disclosure that PVP may have a weight-average molecular weight (MW) of about 6,000 to about 80,000 g/mol. Specific types of PVP may include k12, k15, k30, and k90, and PVP corresponding to k15 and k30 among them may be applied to the embodiment of the present disclosure.

Referring back to FIG. 1, CNTs used as the conductive material 10 in the embodiment of the present disclosure may be a material that complements the conductivity of the active material in the cathode or anode of the secondary battery and forms a path through which electrons may move. CNTs are a linear carbon body and connect an active material to an active material or an active material to a current collector at a much longer distance than a powder, and may easily form a network structure.

CNTs used in the embodiment of the present disclosure may be multi-walled carbon nanotubes (MWCNTs). In the case of single-walled carbon nanotubes (SWCNTs), it has better electrical performance than that of MWCNTs, but there are disadvantages in that it is difficult to prepare a high-content CNT dispersion, and the manufacturing cost (price) is high. In the case of MWCNTs, the diameters of CNTs range from several nm for small ones to tens of nm for large ones. When the diameter is more than about 12 nm, the BET specific surface area is low so that it may be easy to disperse, but the electrical conductivity is reduced so that the role of the conductive material in the secondary battery may not be performed well. Since the CNTs applied to the present disclosure are thin and long MWCNTs, they have quality close to SWCNTs and price advantages of MWCNTs at the same time.

Figure 4:
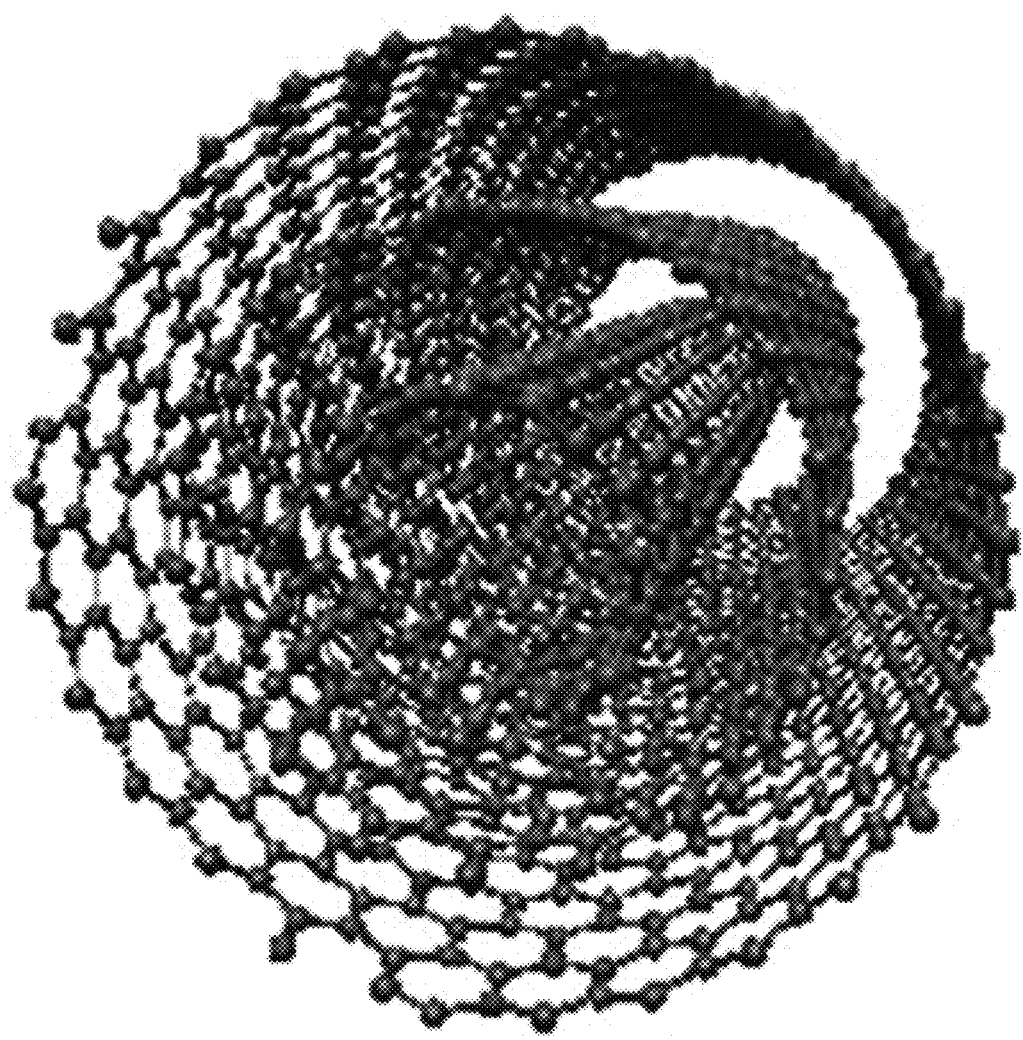
FIG. 4 is a perspective view showing carbon nanotubes (CNTs) that can be applied to a conductive material pre-dispersed slurry for a secondary battery electrode according to one embodiment of the present disclosure.

FIG. 4 is a perspective view showing CNTs that can be applied to a conductive material pre-dispersed slurry for a secondary battery electrode according to one embodiment of the present disclosure.

Referring to FIG. 4, CNTs that can be applied to the conductive material pre-dispersed slurry according to the embodiment of the present disclosure may be MWCNTs. The MWCNTs may have 3 to 10 walls and may have a diameter of 4 to 12 nm. The MWCNTs may have a length of about 50 to 200 μm. The MWCNTs may have a Brunauer-Emmett-Teller (BET) specific surface area of about 300 $m^2/g$ or more. The MWCNTs may have a BET specific surface area of about 300 to 500 $m^2/g$. Since the MWCNTs used have a large BET specific surface area of about 300 $m^2/g$ or more, it may be advantageous to improve conductivity. Meanwhile, the MWCNTs may have a bulk density of about 0.042 g/ml and a purity of about 96.96%.

In the case of MWCNTs of 12 nm or less, it may not be easy to disperse in the solvent 30 due to physical properties such as a relatively large specific surface area or the like. Therefore, in the embodiment of the present disclosure, the dispersion properties of MWCNTs may be greatly improved by using CMC and PVP together as the dispersant 20, appropriately selecting their use ratio, and appropriately selecting their physical properties. While PVP appropriately wraps the MWCNTs, CMC maintains the phase stability of the dispersion. Therefore, according to the embodiment of the present disclosure, even if the MWCNTs are used, a conductive material pre-dispersed slurry having properties of low viscosity and small particle size may be prepared.

When CMC and PVP are mixed and used as a dispersant in the conductive material pre-dispersed slurry according to the embodiment of the present disclosure, and when their weight ratio (CMC:PVP) is adjusted to about 25:1 to 1:25, the dispersion properties of CNTs may be considerably improved, and the particle size of the CNTs may be greatly decreased.

The content of the dispersant compared to the CNTs may also affect the dispersion and viscosity properties. In this regard, in the conductive material pre-dispersed slurry according to the embodiment of the present disclosure, the CNTs and the dispersant (CNT: dispersant) may have a weight ratio of about 1:0.2 to 1:1.5, or about 1:0.5 to 1:1. In other words, the dispersant (i.e., CMC+PVP) may be contained in an amount of about 20 to 150%, or about 50 to 100% compared to the CNTs. When these conditions are satisfied, it may be advantageous to improve the dispersion properties of CNTs and control the viscosity of the slurry. When the ratio of the dispersant (i.e., CMC+PVP) to the CNTs is less than 20%, CNT dispersibility may deteriorate, and when it exceeds 150%, the viscosity of the slurry may increase to an undesirable level, and electrical conductivity may decrease.

In addition, the CNTs may be contained in the conductive material pre-dispersed slurry according to the embodiment of the present disclosure in an amount of about 6 wt % or less. That is, the CNTs may be contained in the total weight of the conductive material pre-dispersed slurry in an amount of about more than 0 wt % and not more than 6 wt %. For example, the CNTs may be contained in an amount of about 1 to 6 wt %. When the CNTs are contained in an amount exceeding 6 wt %, the viscosity of the slurry may increase to an undesirable level, and electrical conductivity may decrease. An electrode having excellent performance may be manufactured by increasing the dispersibility of the CNTs while using a small amount of CNTs. However, the content of CNTs is not limited to the aforesaid ranges, and may be varied.

The conductive material pre-dispersed slurry may have a viscosity of about 3,000 cPs or less under conditions of a temperature of 25° C. and a shear rate of 50 $s^{-1}$. The conductive material pre-dispersed slurry may have a viscosity of about 2,000 cPs or less, or about 1,000 cPs or less. Even when the CNTs have a high content as high as about 6 wt %, the conductive material pre-dispersed slurry may be prepared to have a low viscosity of about 3,000 cPs or less, or about 1,000 cPs or less.

In addition, when the particle size of the conductive material pre-dispersed slurry is measured, the D50 particle size may be smaller than about 0.1 μm. The CNTs may be evenly and well dispersed to the extent that the D50 value is smaller than about 0.1 μm. In this way, when the CNTs have good dispersibility, and the slurry has a small particle size, an electrode manufactured using the slurry may have excellent performance. In addition, it may be possible to implement excellent electrode properties even with a small amount of CNTs.

Figure 5:
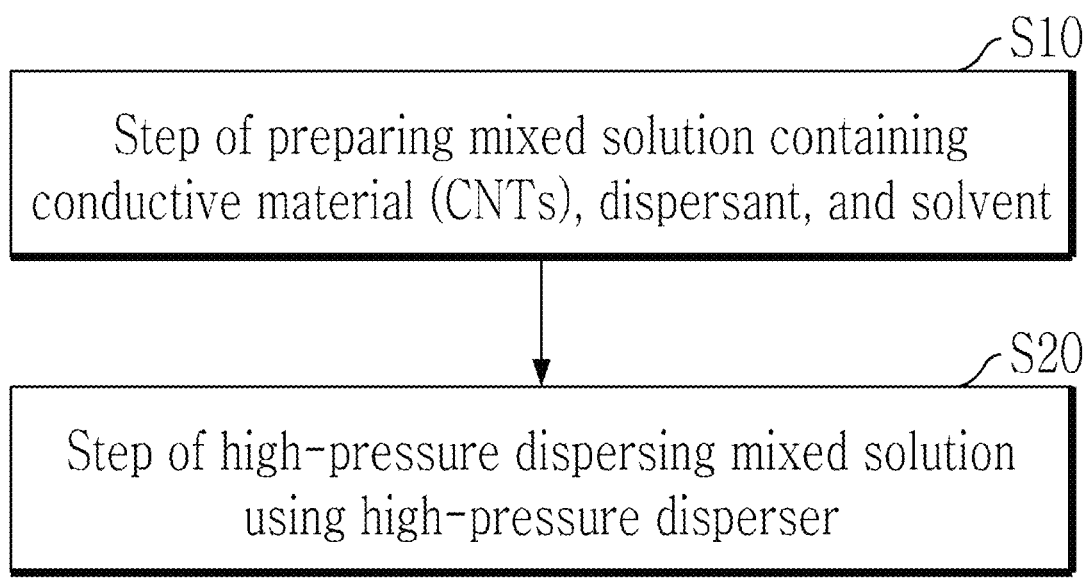
FIG. 5 is a flowchart for explaining a method for preparing a conductive material pre-dispersed slurry for a secondary battery electrode according to one embodiment of the present disclosure.

FIG. 5 is a flowchart for explaining a method for preparing a conductive material pre-dispersed slurry for a secondary battery electrode according to one embodiment of the present disclosure.

Referring to FIG. 5, the method for preparing a conductive material pre-dispersed slurry for a secondary battery electrode according to the embodiment of the present disclosure may include a step (S10) of preparing a mixed solution including a conductive material, a dispersant, and a solvent, and a step (S20) of high-pressure dispersing the mixed solution using a high-pressure disperser. In the step S10, the conductive material may include CNTs, and the dispersant may include CMC and PVP. In addition, CMC and PVP in the dispersant may have a weight ratio (CMC: PVP) of about 25:1 to 1:25. In the step S20, the high-pressure disperser may have an operating pressure of about 200 bars or more. For example, the high-pressure disperser may have an operating pressure of about 200 to 3,000 bars. The high-pressure dispersion using the high-pressure disperser may be performed, for example, about 3 to 10 passes or about 4 to 8 passes at an operating pressure of about 500 to 2,500 bars. According to the embodiment of the present disclosure, it may be possible to perform the high-pressure dispersion within about 5 passes. Accordingly, a conductive material pre-dispersed slurry having a low viscosity while containing high-content CNTs may be easily prepared in a relatively simple and short process.

Figure 6:
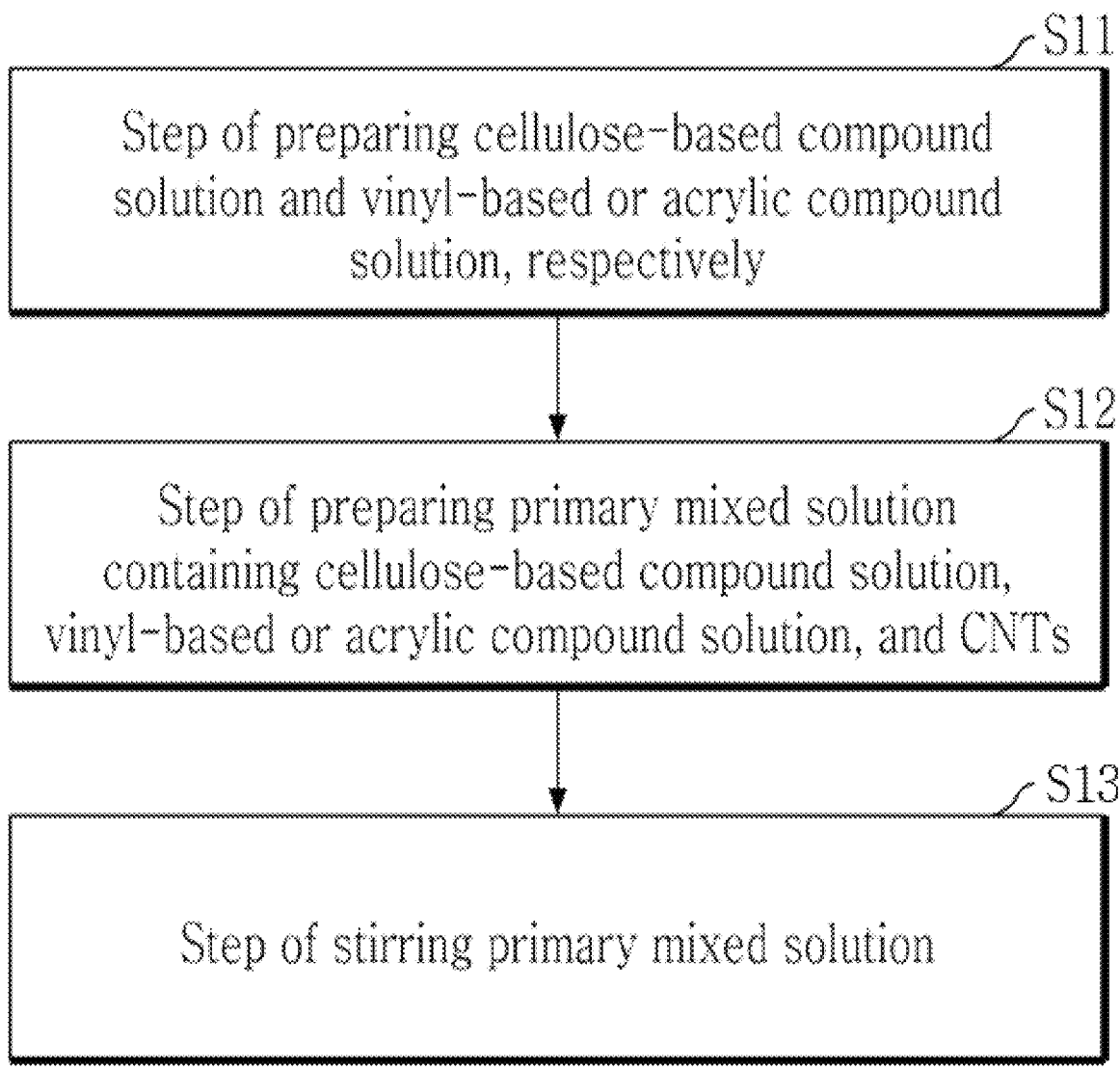
FIG. 6 is a flowchart for explaining process steps that can be applied to the method for preparing the conductive material pre-dispersed slurry of FIG. 5.

The step S10, that is, the step of preparing the mixed solution may include sub-steps (S11 to S13) as shown in FIG. 6.

Referring to FIG. 6, the step of preparing the mixed solution (S10 in FIG. 5) may include a step (S11) of preparing a cellulose-based compound solution containing the cellulose-based compound and a vinyl-based or acrylic compound solution containing the vinyl-based or acrylic compound, respectively, a step (S12) of preparing a primary mixed solution containing the cellulose-based compound solution, the vinyl-based or acrylic compound solution, and the CNTs, and a step (S13) of stirring the primary mixed solution. In the step S12, the primary mixed solution may be prepared by mixing the cellulose-based compound solution, the vinyl-based or acrylic compound solution, CNTs, and an additional solvent (e.g., distilled water). In the step S13, the primary mixed solution may be stirred at a speed of about 3,000 to 10,000 rpm for about 10 minutes to 1 hour. However, the specific process conditions disclosed herein are illustrative, and may vary depending on the case. The mixed solution of the step S10 in FIG. 5 may be prepared by stirring the primary mixed solution. The mixed solution may be referred to as a CNT dispersion solution.

The conductive material pre-dispersed slurry according to the embodiment may be prepared by high-pressure dispersing the mixed solution in the step S20 in FIG. 5. The composition and properties of the conductive material pre-dispersed slurry may be substantially the same as those described with reference to FIGS. 1 to 4. In the conductive material pre-dispersed slurry, CMC may have a weight-average molecular weight (MW) of about 450,000 g/mol or less, and CMC may have a degree of esterification (DE) of about 0.6 to 1.0. In the conductive material pre-dispersed slurry, the PVP may have a weight-average molecular weight (MW) of about 6,000 to 80,000 g/mol. In the conductive material pre-dispersed slurry, the CNTs may be MWCNTs, and in this case, the MWCNTs may have a diameter of about 4 to 12 nm. The MWCNTs may have a length of about 50 to 200 μm, and the MWCNTs may have a BET specific surface area of about 300 $m^2/g$ or more. In the conductive material pre-dispersed slurry, the CNTs and the dispersant may have a weight ratio (CNT:dispersant) of about 1:0.2 to 1:1.5. The CNTs may be contained in the conductive material pre-dispersed slurry in an amount of about 6 wt % or less. The conductive material pre-dispersed slurry may have a viscosity of about 3,000 cPs or less under conditions of a temperature of 25° C. and a shear rate of 50 $s^{-1}$. In addition, the conductive material pre-dispersed slurry may have a D50 particle size smaller than about 0.1 μm. In addition, the specific composition and properties of the conductive material pre-dispersed slurry may be the same as those described with reference to FIGS. 1 to 4.

Experimental Method

The conductive material pre-dispersed slurry according to the embodiment of the present disclosure was prepared by the following method and its properties were evaluated.

(1) After putting 950 g of a solvent (distilled water) into a flask and adding 50 g of PVP, 5 wt % of a PVP solution (aqueous solution) was prepared by stirring at room temperature for 2 hours.

(2) After putting 950 g of a solvent (distilled water) into a flask and adding 50 g of CMC, 5 wt % of a CMC solution (aqueous solution) was prepared by stirring at room temperature for 2 hours.

(3) 400 g of a CNT dispersion solution (i.e., a mixed solution) was prepared by putting the PVP solution, the CMC solution, CNTs, and an additional solvent (distilled water) into a beaker and stirring for 30 minutes at 6,000 rpm using a Homo mixer. The CNT dispersion solution (mixed solution) contained 5 wt % of the CNTs, 0.12 to 3.63 wt % of CMC, 0.12 to 3.63 wt % of the PVP, and 86.0 to 94.25 wt % of the solvent (distilled water).

(4) A conductive material pre-dispersed slurry containing 3 wt % of CNTs was prepared by a high-pressure dispersion process on the CNT dispersion solution (mixed solution) at 1,300 bars for 5 to 12 passes using a high-pressure disperser (Micronox Co., Ltd., MN400BF).

The viscosity of the conductive material pre-dispersed slurry prepared as described above was measured using an HR-2 Viscometer (TA Instruments Co.) under conditions of a temperature of 25° C., a shear rate of 50 s$^{-1}$, and a plate of Φ40 mm. In addition, after diluting the conductive material pre-dispersed slurry prepared as described above to 0.0004 wt %, the D50 particle size was measured using a particle size analyzer (Malvern Co.).

The conductive material pre-dispersed slurry prepared as described above was coated to a thickness of 7 to 8 μm on a PET film using a blader, and the sheet resistance was measured using a sheet resistance measuring instrument MCP-T610 (Mitsubishi chemical Co.).

Specific mixing conditions and evaluation results of samples according to Examples and Comparative Examples prepared by applying the method as described above are as shown in Tables 1 and 2 below. In addition, in the remarks column of Table 2, A represents CMC, and B represents PVP, PVA, PAA, and PAM. CMC used in Table 1 below is CMC1, and CMC1 has a weight-average molecular weight (MW) of 50,000 to 120,000 g/mol. PVP used in Table 1 has a weight-average molecular weight (MW) of 6,000 to 80,000 g/mol, PVA has a weight-average molecular weight (MW) of 6,000 to 40,000 g/mol, PAA has a weight-average molecular weight (MW) of 8,000 to 120,000 g/mol, and PAM has a weight-average molecular weight (MW) of 10,000 to 150,000 g/mol.

TABLE 1

| Classification | CNT (wt %) | CMC1 (A) (wt %) | PVP (B) (wt %) | PVA (B) (wt %) | PAA (B) (wt %) | PAM (B) (wt %) | Dispersant A (% compared to CNTs) | Dispersant B (% compared to CNTs) | Dispersant ratio | Degree of esterification |
|---|---|---|---|---|---|---|---|---|---|---|
| Example 1 | 5 | 0.144 | 3.606 | | | | 2.88 | 72.12 | 75 | 0.6-1.0 |
| Example 2 | 5 | 0.1875 | 3.5625 | | | | 3.75 | 71.25 | 75 | 0.6-1.0 |
| Example 3 | 5 | 0.375 | 3.375 | | | | 7.50 | 67.50 | 75 | 0.6-1.0 |
| Example 4 | 5 | 0.750 | 3.000 | | | | 15.00 | 60.00 | 75 | 0.6-1.0 |
| Example 5 | 5 | 1.250 | 2.500 | | | | 25.00 | 50.00 | 75 | 0.6-1.0 |
| Example 6 | 5 | 1.875 | 1.875 | | | | 37.50 | 37.50 | 75 | 0.6-1.0 |
| Example 7 | 5 | 2.500 | 1.250 | | | | 50.00 | 25.00 | 75 | 0.6-1.0 |
| Example 8 | 5 | 3.000 | 0.750 | | | | 60.00 | 15.00 | 75 | 0.6-1.0 |
| Example 9 | 5 | 3.375 | 0.375 | | | | 67.50 | 7.50 | 75 | 0.6-1.0 |
| Example 10 | 5 | 3.563 | 0.188 | | | | 71.25 | 3.75 | 75 | 0.6-1.0 |
| Example 11 | 5 | 3.606 | 0.144 | | | | 72.12 | 2.88 | 75 | 0.6-1.0 |
| Example 12 | 5 | 0.375 | | 3.375 | | | 7.50 | 67.50 | 75 | 0.6-1.0 |
| Example 13 | 5 | 0.1875 | | 3.5625 | | | 3.75 | 71.25 | 75 | 0.6-1.0 |
| Example 14 | 5 | 0.375 | | | 3.375 | | 7.50 | 67.50 | 75 | 0.6-1.0 |
| Example 15 | 5 | 0.1875 | | | 3.5625 | | 3.75 | 71.25 | 75 | 0.6-1.0 |
| Example 16 | 5 | 0.375 | | | | 3.375 | 7.50 | 67.50 | 75 | 0.6-1.0 |
| Example 17 | 5 | 0.1875 | | | | 3.5625 | 3.75 | 71.25 | 75 | 0.6-1.0 |
| Comparative Example 1 | 5 | 0.121 | 3.629 | | | | 2.42 | 72.58 | 75 | 0.6-1.0 |
| Comparative Example 2 | 5 | 3.629 | 0.121 | | | | 72.58 | 2.42 | 75 | 0.6-1.0 |
| Comparative Example 3 | 5 | 0.121 | | 3.629 | | | 2.42 | 72.58 | 75 | 0.6-1.0 |
| Comparative Example 4 | 5 | 0.121 | | | 3.629 | | 2.42 | 72.58 | 75 | 0.6-1.0 |
| Comparative Example 5 | 5 | 0.121 | | | | 3.629 | 2.42 | 72.58 | 75 | 0.6-1.0 |

TABLE 2

| Classification | Number of High-Pressure Dispersion Passes | Viscosity (40 mm, 50 s⁻¹, cP) | Particle size D50 (μm) | Remarks |
|---|---|---|---|---|
| Example 1 | 6 | 1,313 | 0.0652 | A:B = 1:25 |
| Example 2 | 5 | 864 | 0.0223 | A:B = 1:19 |
| Example 3 | 5 | 732 | 0.0289 | A:B = 1:9 |
| Example 4 | 5 | 1,220 | 0.0596 | A:B = 1:4 |
| Example 5 | 5 | 1,510 | 0.0620 | A:B = 1:2 |
| Example 6 | 7 | 2,329 | 0.0707 | A:B = 1:1 |
| Example 7 | 5 | 1,688 | 0.0320 | A:B = 2:1 |
| Example 8 | 5 | 1,650 | 0.0300 | A:B = 4:1 |
| Example 9 | 5 | 1,350 | 0.0263 | A:B = 9:1 |
| Example 10 | 5 | 1,270 | 0.0263 | A:B = 19:1 |
| Example 11 | 6 | 1,828 | 0.0844 | A:B = 25:1 |
| Example 12 | 5 | 1,245 | 0.0357 | A:B = 1:9 |
| Example 13 | 5 | 9,84 | 0.0242 | A:B = 1:19 |
| Example 14 | 5 | 1,522 | 0.0645 | A:B = 1:9 |
| Example 15 | 5 | 1,020 | 0.0243 | A:B = 1:19 |
| Example 16 | 5 | 1,417 | 0.0924 | A:B = 1:9 |
| Example 17 | 5 | 1,110 | 0.0352 | A:B = 1:19 |
| Comparative Example 1 | 9 | 3,410 | 10.5 | A:B = 1:30 |
| Comparative Example 2 | 10 | 3,820 | 12.1 | A:B = 30:1 |
| Comparative Example 3 | 11 | 3,722 | 5.7 | A:B = 1:30 |
| Comparative Example 4 | 11 | 4,510 | 15.2 | A:B = 1:30 |
| Comparative Example 5 | 11 | 4,250 | 10.4 | A:B = 1:30 |

Referring to Examples 1 to 11 and Comparative Examples 1 and 2 in Tables 1 and 2, it can be confirmed from the viscosity results according to the ratios of dispersant component A (CMC) and dispersant component B (PVP) that the viscosities are far lower than other ratios when the ratios of dispersant component B (PVP) to dispersant component A (CMC) become about 25:1 to 1:25. Among them, it can be seen that the viscosities are lowest when the ratios are within a range of 19:1 to 1:19. Referring to Examples 12 to 17 and Comparative Examples 3 to 5, even when PVP (B) is replaced with PVA (B), PAA (B), and PAM (B), the low viscosity results are shown when the ratios are within the range of 19:1 to 1:19, and the viscosities and particle sizes are increased when the ratios are out of the range. Excellent results can be confirmed even when the PAA, PVA and PAM are used together with CMC, but it can be confirmed that PVP is superior in viscosity and particle size D50 when the high-pressure dispersion pass numbers are the same.

TABLE 4

| Classification | Number of High-Pressure Dispersion Passes | Viscosity (40 mm, 50 s⁻¹, cP) | Particle size D50 (μm) | Remarks |
|---|---|---|---|---|
| Example 2 | 5 | 864 | 0.0223 | A:B = 1:19 |
| Example 18 | 5 | 1,025 | 0.0352 | A:B = 1:19 |
| Example 19 | 6 | 1,822 | 0.0341 | A:B = 1:19 |
| Example 20 | 7 | 2,510 | 0.075 | A:B = 1:19 |
| Example 21 | 10 | 4,220 | 0.135 | A:B = 1:19 |
| Example 22 | 5 | 1,135 | 0.0452 | A:B = 1:19 |
| Example 23 | 5 | 1,520 | 0.0377 | A:B = 1:19 |
| Example 24 | 5 | 2,311 | 0.0521 | A:B = 1:19 |
| Example 25 | 8 | 3,460 | 0.092 | A:B = 1:19 |

In Tables 3 and 4, the dispersant ratio means the ratio (%) of the dispersant (i.e., CMC+PVP) to CNTs. Referring to Example 2 and Examples 18 to 25, it can be seen that when the ratio of the dispersant to CNTs is about 20 to 150% or about 50 to 100%, low viscosity numerical values are exhibited. In addition, it was confirmed to have a low D50 particle size (μm) of 0.1 or less. In the conductive material pre-dispersed slurry, a preferred ratio (or optimal ratio) of the CNTs, dispersant component A (CMC), dispersant component B (PVP) and solvent may be present.

Blending conditions and evaluation results of samples according to additional Examples and Comparative Examples are as shown in Tables 5 to 12 below. CMC used in Tables 5 and 6 is CMC1, and CMC1 has a weight-average molecular weight (MW) of 50,000 to 120,000 g/mol. CMC used in Tables 7 and 8 was CMC that differed from CMC1 only in degree of esterification. CMCs used in Tables 9 and 10 are CMC2 to CMC4, CMC2 has a weight-average molecular weight (MW) of 200,000 to 450,000 g/mol, and CMC3 has a weight-average molecular weight (MW) of 700,000 to 1,000,000 g/mol, and CMC4 has a weight-average molecular weight (MW) of 1,500,000 to 2,300,000 g/mol.

TABLE 3

| Classification | CNT (wt %) | CMC1 (A) (wt %) | PVP (B) (wt %) | PVA (B) (wt %) | PAA (B) (wt %) | PAM (B) (wt %) | Dispersant A (% compared to CNTs) | Dispersant B (% compared to CNTs) | Dispersant ratio | Degree of esterification |
|---|---|---|---|---|---|---|---|---|---|---|
| Example 2 | 5 | 0.1875 | 3.5625 | | | | 3.75 | 71.25 | 75 | 0.6-1.0 |
| Example 18 | 5 | 0.125 | 2.375 | | | | 2.5 | 47.5 | 50 | 0.6-1.0 |
| Example 19 | 5 | 0.0625 | 1.1875 | | | | 1.25 | 23.75 | 25 | 0.6-1.0 |
| Example 20 | 5 | 0.05 | 0.95 | | | | 1 | 19 | 20 | 0.6-1.0 |
| Example 21 | 5 | 0.0375 | 0.7125 | | | | 0.75 | 14.25 | 15 | 0.6-1.0 |
| Example 22 | 5 | 0.25 | 4.75 | | | | 5 | 95 | 100 | 0.6-1.0 |
| Example 23 | 5 | 0.3125 | 5.9375 | | | | 6.25 | 118.75 | 125 | 0.6-1.0 |
| Example 24 | 5 | 0.375 | 7.125 | | | | 7.5 | 142.5 | 150 | 0.6-1.0 |
| Comparative Example 25 | 5 | 0.45 | 8.55 | | | | 9 | 171 | 180 | 0.6-1.0 |

TABLE 5

| Classification | CNT (wt %) | CMC1 (A) (wt %) | PVP (B) (wt %) | PVA (B) (wt %) | PAA (B) (wt %) | PAM (B) (wt %) | Dispersant A (% compared to CNTs) | Dispersant B (% compared to CNTs) | Dispersant ratio | Degree of esterification |
|---|---|---|---|---|---|---|---|---|---|---|
| Example 2  | 5 | 0.1875 | 3.5625 | | | | 3.75 | 71.25 | 75 | 0.6-1.0 |
| Example 26 | 6 | 0.225  | 4.275  | | | | 3.75 | 71.25 | 75 | 0.6-1.0 |
| Example 27 | 7 | 0.2625 | 4.9875 | | | | 3.75 | 71.25 | 75 | 0.6-1.0 |

TABLE 6

| Classification | Number of High-Pressure Dispersion Passes | Viscosity (40 mm, 50 s$^{-1}$, cP) | Particle size D50 (μm) | Remarks |
|---|---|---|---|---|
| Example 2  | 5  | 864   | 0.0223 | A:B = 1:19 |
| Example 26 | 8  | 2,980 | 0.099  | A:B = 1:19 |
| Example 27 | 12 | 6,645 | 0.52   | A:B = 1:19 |

TABLE 7

| Classification | CNT (wt %) | CMC1 (A) (wt %) | PVP (B) (wt %) | PVA (B) (wt %) | PAA (B) (wt %) | PAM (B) (wt %) | Dispersant A (% compared to CNTs) | Dispersant B (% compared to CNTs) | Dispersant ratio | Degree of esterification |
|---|---|---|---|---|---|---|---|---|---|---|
| Example 2  | 5 | 0.1875 | 3.5625 | | | | 3.75 | 71.25 | 75 | 0.6-1.0 |
| Example 28 | 5 | 0.1875 | 3.5625 | | | | 3.75 | 71.25 | 75 | 1.0-1.5 |

TABLE 8

| Classification | Number of High-Pressure Dispersion Passes | Viscosity (40 mm, 50 s$^{-1}$, cP) | Particle size D50 (μm) | Remarks |
|---|---|---|---|---|
| Example 2  | 5 | 864   | 0.0223 | A:B = 1:19 |
| Example 28 | 8 | 4,255 | 0.154  | A:B = 1:19 |

TABLE 9

| Classification | CNT (wt %) | CMC1 (A) (wt %) | CMC2 (A) (wt %) | CMC3 (A) (wt %) | CMC4 (A) (wt %) | PVP (B) (wt %) | CMC (% compared to CNTs) | PVP (% compared to CNTs) | Dispersant ratio | Degree of esterification |
|---|---|---|---|---|---|---|---|---|---|---|
| Example 2  | 5 | 0.1875 |        |        |        | 3.5625 | 3.75 | 71.25 | 75 | 0.6-1.0 |
| Example 29 | 5 |        | 0.1875 |        |        | 3.5625 | 3.75 | 71.25 | 75 | 0.6-1.0 |
| Example 30 | 5 |        |        | 0.1875 |        | 3.5625 | 3.75 | 71.25 | 75 | 0.6-1.0 |
| Example 31 | 5 |        |        |        | 0.1875 | 3.5625 | 3.75 | 71.25 | 75 | 0.6-1.0 |

TABLE 10

| Classification | Number of High-Pressure Dispersion Passes | Viscosity (40 mm, 50 s$^{-1}$, cP) | Particle size D50 (μm) | Remarks |
|---|---|---|---|---|
| Example 2  | 5  | 864   | 0.0223 | A:B = 1:19 |
| Example 29 | 8  | 2,248 | 0.0442 | A:B = 1:19 |
| Example 30 | 10 | 3,462 | 5.44   | A:B = 1:19 |
| Example 31 | 10 | 5,270 | 10.2   | A:B = 1:19 |

TABLE 11

| Classification | CNT (wt %) (2 nm) | CNT (wt %) (4~12 nm) | CNT (wt %) (15~25 nm) | CNT (wt %) (30~45 nm) | CMC1 (A) (wt %) | PVP (B) (wt %) | Dispersant A (% compared to CNTs) | Dispersant B (% compared to CNTs) | Dispersant ratio | Degree of esterification |
|---|---|---|---|---|---|---|---|---|---|---|
| Example 2 | | 5 | | | 0.1875 | 3.5625 | 3.75 | 71.25 | 75 | 0.6-1.0 |
| Example 32 | 5 | | | | 0.1875 | 3.5625 | 3.75 | 71.25 | 75 | 0.6-1.0 |
| Example 33 | | | 5 | | 0.1875 | 3.5625 | 3.75 | 71.25 | 75 | 0.6-1.0 |
| Example 34 | | | | 5 | 0.1875 | 3.5625 | 3.75 | 71.25 | 75 | 0.6-1.0 |

TABLE 12

| Classification | Number of High-Pressure Dispersion Passes | Viscosity (40 mm, 50 s$^{-1}$, cP) | Particle size D50 (μm) | Sheet resistance (Ohm/sq.) | Remarks |
|---|---|---|---|---|---|
| Example 2 | 5 | 864 | 0.0223 | 12 | A:B = 1:19 |
| Example 32 | 10 | 13,000 | 25.1 | 5 | A:B = 1:19 |
| Example 33 | 5 | 625 | 0.0852 | 48 | A:B = 1:19 |
| Example 34 | 5 | 433 | 0.154 | 151 | A:B = 1:19 |

Referring to Examples 26 and 27 of Tables 5 and 6, it can be seen that when the content of CNTs is 6 wt %, the viscosity of 3,000 cPs and the particle size D50 of 0.1 μm are satisfied, but when the content of CNTs is 7 wt %, the viscosity and particle size are greatly increased.

Referring to Example 28 of Tables 7 and 8, it can be seen that the viscosity and particle size are measured to be high when CMC having a degree of esterification of 1.0 to 1.5 is used. Referring to Examples 29 to 31 of Table 9 and Table 10, the results of CNT dispersions according to the molecular weight of CMC can be seen. When the weight-average molecular weight (MW) of the CMC used increases beyond a predetermined level, a problem in which the D50 particle size value increases excessively may occur.

Referring to Examples 32 to 34 of Table 11 and Table 12, the results of the dispersions according to the CNT diameters can be confirmed. When the CNT diameter is smaller than 4 nm, the viscosity and particle size increase greatly, making it difficult to prepare a high-content CNT dispersion. On the other hand, when the CNT diameter is greater than 12 nm, it is easy to prepare a dispersion with low viscosity, but it is confirmed that the sheet resistance component is greatly increased and may not play a role as a conductive material for a secondary battery.

A slurry for an electrode may be prepared by mixing the conductive material pre-dispersed slurry according to the embodiment as described above with a predetermined active material, a binder, etc., and an electrode (electrode film) for a secondary battery may be formed by applying the slurry for the electrode on a predetermined substrate and performing a drying process, annealing process or the like thereon. In addition, a secondary battery to which such an electrode is applied can be manufactured.

Figure 7:
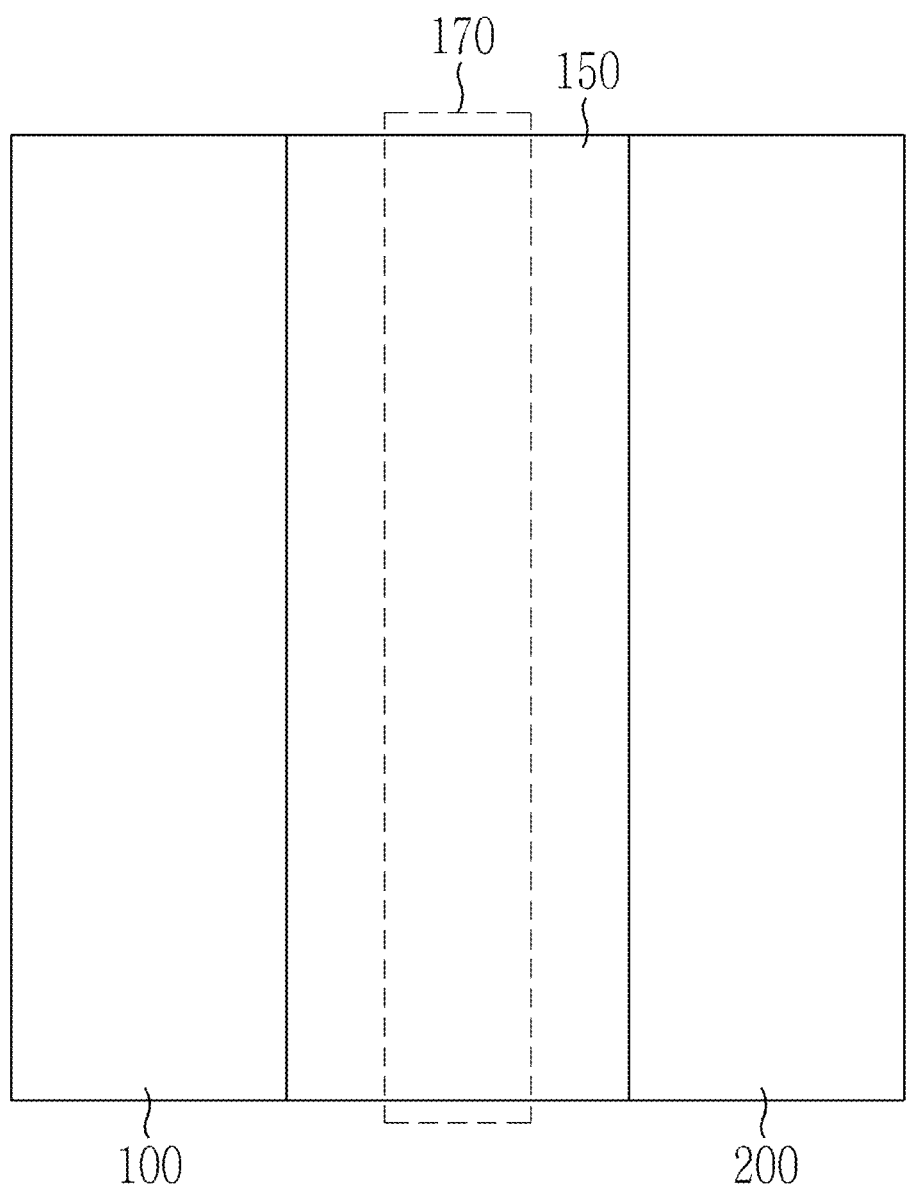
FIG. 7 is a cross-sectional view showing a secondary battery having an electrode manufactured by applying a conductive material pre-dispersed slurry for a secondary battery electrode according to one embodiment of the present disclosure.

FIG. 7 is a cross-sectional view showing a secondary battery having an electrode manufactured by applying a conductive material pre-dispersed slurry for a secondary battery electrode according to one embodiment of the present disclosure.

Referring to FIG. 7, the secondary battery according to the present embodiment may include a cathode 100 and an anode 200 spaced apart from each other, and an electrolyte 150 provided for ion movement therebetween. A separator 170 may be further provided between the cathode 100 and the anode 200, thereby allowing the movement of the electrolyte 150 or the movement of ions through the electrolyte 150 while physically separating them. In some cases, the separator 170 may not be provided.

The cathode 100 may comprise a predetermined electrode material for the cathode. The cathode 100 may comprise a cathode active material, a first binder, and a first conductive material. The cathode active material, the first binder, and the first conductive material may constitute one cathode active material layer. The cathode 100 may include a cathode current collector bonded to the cathode active material layer. In this case, the cathode active material layer may be disposed between the cathode current collector and the electrolyte 150.

The anode 200 may comprise a predetermined electrode material for the anode. The anode 200 may comprise an anode active material, a second binder, and a second conductive material. The anode active material, the second binder, and the second conductive material may constitute one anode active material layer. The anode 200 may include an anode current collector bonded to the anode active material layer. In this case, the anode active material layer may be disposed between the anode current collector and the electrolyte 150.

At least one of the cathode 100 or the anode 200 may be manufactured by applying the conductive material pre-dispersed slurry according to the embodiment of the present disclosure. For example, at least the anode 200 may be manufactured by applying the conductive material pre-dispersed slurry according to the embodiment of the present disclosure. The secondary battery according to the present embodiment may be, for example, a lithium secondary battery, but may also be other types of batteries.

As described above, according to embodiments of the present disclosure, a technology/method capable of effectively dispersing CNTs while preventing/minimizing damage to CNTs can be implemented in developing a material for the conductive material to which CNTs are applied. According to such embodiments, it is possible to implement a conductive material pre-dispersed slurry for a secondary battery electrode having improved dispersion properties of CNTs (conductive material). In particular, it is possible to implement a conductive material pre-dispersed slurry for a secondary battery electrode, which has a relatively high CNT (conductive material) content and a relatively low viscosity, and can be easily prepared through a relatively simple process. An electrode having excellent performance can be manufactured by applying the above-described conductive material pre-dispersed slurry, and a secondary battery to which the above-described electrode is applied can be manufactured.

In the present specification, exemplary embodiments of the present disclosure have been disclosed, and although specific terms have been used, they are only used in a general sense to more easily explain the technical details of the present disclosure and help with understanding of the disclosure, and are not intended to limit the scope of the present disclosure. It is obvious to those having ordinary skill in the art to which the present disclosure pertains that other modifications based on the technical idea of the present disclosure can be implemented in addition to the embodiments disclosed herein. That is, it will be appreciated by those having ordinary skill in the art that a conductive material pre-dispersed slurry for a secondary battery electrode, a preparation method thereof, an electrode manufactured by applying the conductive material pre-dispersed slurry, and a secondary battery including the electrode, according to the embodiments which have been described with reference to FIGS. 1 to 7, can be variously modified. Therefore, the scope of the disclosure should not be determined by the described embodiments, and should be determined by the technical concepts described in the claims.

What is claimed is:

1. A conductive material pre-dispersed slurry for a secondary battery electrode, comprising:
   a conductive material;
   a dispersant for dispersing the conductive material; and
   a solvent mixed with the conductive material and the dispersant,
   wherein the dispersant includes a cellulose-based compound and a vinyl-based or acrylic compound,
   wherein the cellulose-based compound and the vinyl-based or acrylic compound in the dispersant have a weight ratio of 25:1 to 1:25, and
   wherein the conductive material and the dispersant have a weight ratio of 1:0.5 to 1:1.

2. The conductive material pre-dispersed slurry of claim 1, wherein the cellulose-based compound has a weight-average molecular weight (MW) of 450,000 g/mol or less.

3. The conductive material pre-dispersed slurry of claim 1, wherein the cellulose-based compound has a degree of esterification (DE) of 0.6 to 1.0.

4. The conductive material pre-dispersed slurry of claim 1, wherein the cellulose-based compound is one or more selected from the group consisting of methyl cellulose, ethyl cellulose, hydroxyethyl cellulose, benzyl cellulose, trityl cellulose, cyanoethyl cellulose, carboxymethyl cellulose, carboxyethyl cellulose, aminoethyl cellulose, nitrocellulose, cellulose ether, and carboxymethylcellulose sodium salt.

5. The conductive material pre-dispersed slurry of claim 1, wherein the vinyl-based compound has a weight-average molecular weight (MW) of 6,000 to 80,000 g/mol, and
   wherein the acrylic compound has a weight-average molecular weight (MW) of 8,000 to 150,000 g/mol.

6. The conductive material pre-dispersed slurry of claim 1, wherein the vinyl-based or acrylic compound surrounds a periphery of the conductive material.

7. The conductive material pre-dispersed slurry of claim 1, wherein the vinyl-based compound is one or more selected from the group consisting of polyvinylpyrrolidone, polyvinyl alcohol, polyvinyl chloride, polyvinyl fluoride, and polyvinyl acetate, and
   wherein the acrylic compound is one or more selected from the group consisting of polyacrylic acid, polyacrylamide, and polyacrylonitrile.

8. The conductive material pre-dispersed slurry of claim 1, wherein the conductive material is one or more selected from the group consisting of graphite, carbon black, graphene, and carbon nanotubes (CNTs).

9. The conductive material pre-dispersed slurry of claim 8, wherein the carbon nanotubes (CNTs) are multi-walled carbon nanotubes (MWCNTs).

10. The conductive material pre-dispersed slurry of claim 9, wherein the multi-walled carbon nanotubes (MWCNTs) have a diameter of 4 to 12 nm.

11. The conductive material pre-dispersed slurry of claim 8, wherein the carbon nanotubes (CNTs) are contained in an amount of more than 0 wt % and not more than 6 wt %.

12. The conductive material pre-dispersed slurry of claim 1, wherein the conductive material pre-dispersed slurry has a viscosity of 3,000 cPs or less under conditions of a temperature of 25° C. and a shear rate of 50 $s^{-1}$.

13. The conductive material pre-dispersed slurry of claim 1, wherein the conductive material pre-dispersed slurry has a D50 particle size smaller than 0.1 μm.

14. The conductive material pre-dispersed slurry of claim 1, wherein the solvent includes water.

15. An electrode for a secondary battery, which is manufactured by applying the conductive material pre-dispersed slurry of claim 1.

16. A secondary battery comprising the electrode of claim 15.

* * * * *